United States Patent [19]

Young

[11] Patent Number: 4,969,768

[45] Date of Patent: Nov. 13, 1990

[54] COUPLER FOR IV POLE

[76] Inventor: Robert J. Young, #6 Country Trails, Rochester, Ill. 62563

[21] Appl. No.: 413,688

[22] Filed: Sep. 28, 1989

[51] Int. Cl.$^5$ .............................................. F16C 11/00
[52] U.S. Cl. ........................................ 403/97; 403/24
[58] Field of Search ..................................... 403/97, 24

[56] References Cited

U.S. PATENT DOCUMENTS

| 663,121 | 12/1900 | Frost | 403/97 X |
| 970,751 | 9/1910 | Pranke | 403/97 X |
| 2,555,226 | 5/1951 | Draughn | 403/97 X |
| 2,676,340 | 4/1954 | Garriott et al. | 403/97 X |
| 4,741,222 | 5/1988 | Berndt | 403/97 X |

Primary Examiner—Andrew V. Kundrat
Attorney, Agent, or Firm—Marshall, O'Toole, Gerstein, Murray & Bicknell

[57] ABSTRACT

A coupler to interconnect a number of pieces of equipment together comprising a number of attachment devices each adapted to be coupled to a piece of equipment, a number of arms connected at one end to an attachment device, and an adjustable arm rotation locking device interconnecting all the arms together at a desired orientation angle.

12 Claims, 2 Drawing Sheets

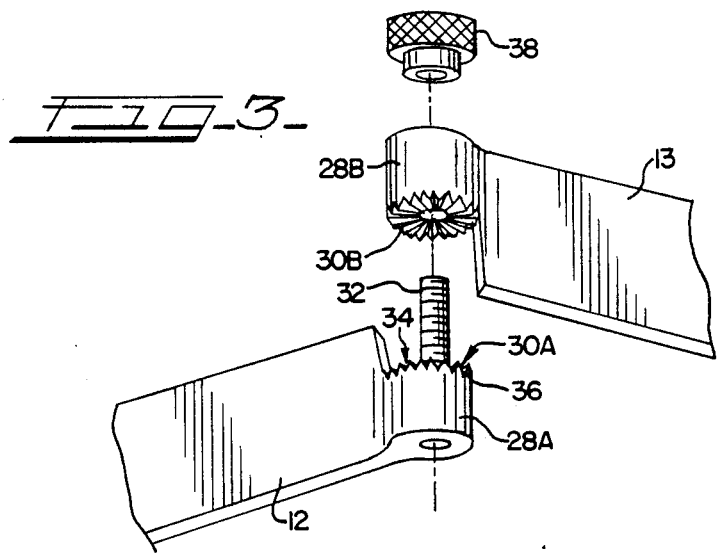
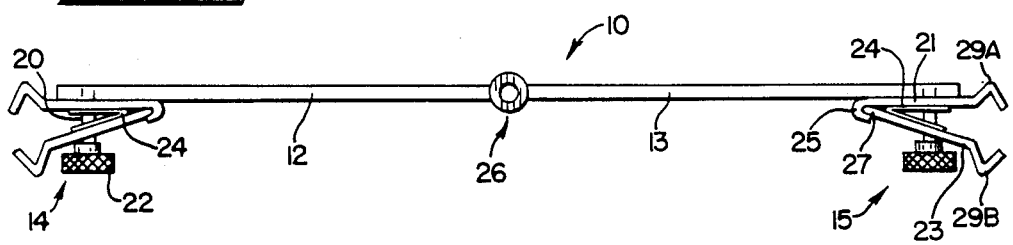
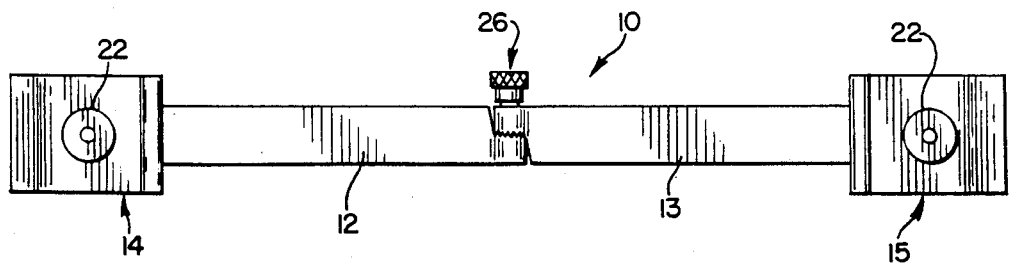

COUPLER FOR IV POLE

FIELD OF INVENTION

This invention relates to an apparatus for coupling equipment together. More specifically this invention relates to a coupler for attaching an IV (intravenous) pole to hospital equipment such as a wheelchair, bed, stretcher, etc.

BACKGROUND OF THE INVENTION

In the past gravity flow IV's were generally used when intravenous fluids needed to be administered to a patient. During the past several years, however, most IV poles have been equipped with IV pumps. With the addition of an IV pump to an IV pole it is now not possible to put the IV pump-equipped IV poles on the beds or wheelchairs used to transport a patient. Consequently, it is now awkward for a nurse or attendant to both simultaneously push the wheelchair and pull the IV pump equipped pole while also at the same time keep the IV tubing free from the wheels of the wheelchair. Similarly, a patient who attempts to be independently mobile would encounter, and have a tougher time overcoming, the same problems.

Also these IV pump equipped poles tend to be top heavy and are capable of being toppled.

It is a general object of this invention to provide an improved apparatus to avoid the foregoing problems of the prior art.

SUMMARY OF THE INVENTION

An improved apparatus is provided to couple pieces of equipment together. This coupler comprises, broadly, a number of attachment devices each of which is mounted on an associated arm. The arms are interconnected by an adjustable arm rotation locking device, and the arms are rotatable about this adjustable arm rotation locking device to achieve a desired angle with respect to each other. The adjustable arm rotation locking device can then lock every arm in place to maintain this desired angle.

BRIEF DESCRIPTION OF THE DRAWINGS

The foregoing and other objects, features and advantages of the invention will be more apparent from the following detailed description of an embodiment of the invention, as illustrated in the accompanying figures of the drawings, in which like reference characters refer to the same parts throughout the different views, wherein:

FIG. 3 is an exploded perspective view of an adjustable arm rotation locking device of the coupler;

FIG. 4 is a top view of the coupler; and

FIG. 5 is a side view of the coupler.

DETAILED DESCRIPTION OF THE INVENTION

Figure 1:
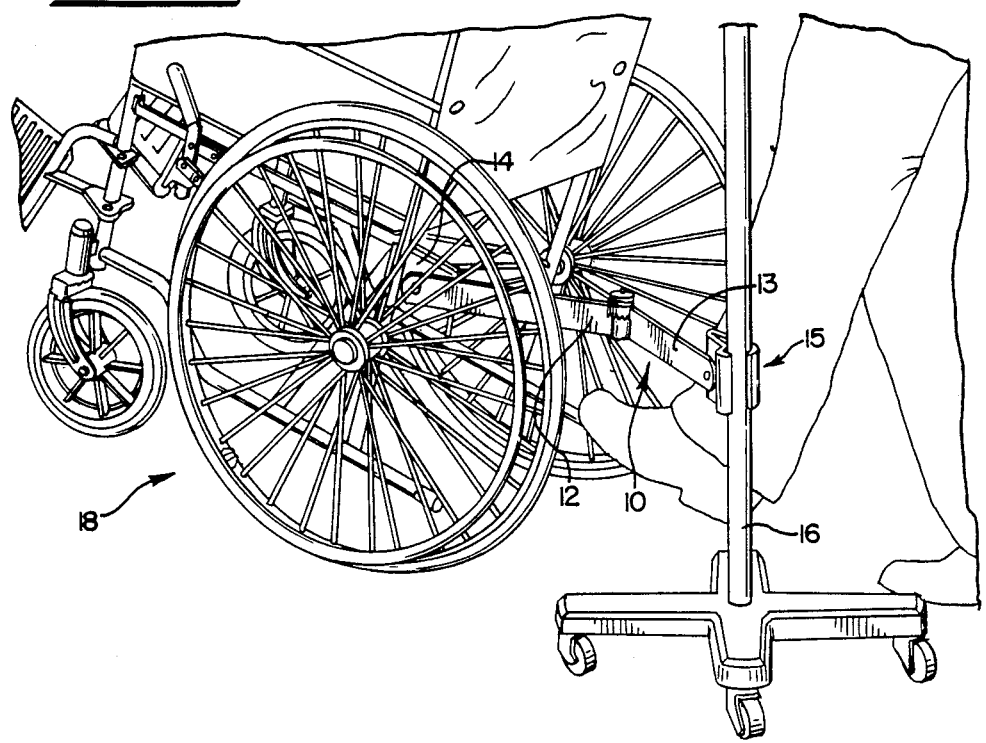
FIG. 1 is a fragmentary perspective view of an apparatus including a coupler in accordance with the invention.
Figure 2:
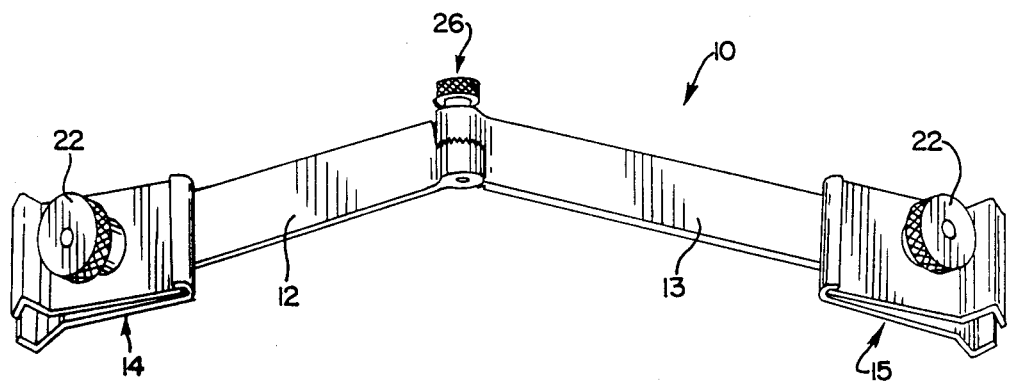
FIG. 2 is an enlarged perspective view of the coupler.

The coupler 10, in accordance with a preferred embodiment of this invention shown in FIG. 2, comprises two arms 12 and 13 connected together by a locking device 26. At the ends of the arms are mounted attachment devices 14 and 15, which may be attached to pieces of equipment to be coupled, such as an IV pole 16 or a cylindrical part of a wheelchair 18 as shown in FIG. 1. The attachment devices 14 and 15 are clamps which are attached to the arms 12 and 13 respectively, via threaded screws 20, each screw having a large knurled knob 22. The clamps are each comprised of an inner jaw 21 and an outer jaw 23, best shown in FIG. 4. The inner jaw 21 has a hook 25 at one end, while the outer jaw 23 has a straight end 27 without a hook. This hook 25 creates a cavity which pivotably receives the straight end 27 of the outer jaw 23. Both jaws 21 and 23 also have a V-shaped outer end 29A and 29B within which the hospital equipment is clamped. The clamps are fitted with a V-shaped spring insert 24, as shown in FIG. 4, which pushes the V-shaped jaw ends apart. The hook 25 of the inner jaw retains the straight end 27 of the outer jaw 23, which allows the outer jaw 23 to pivot within the hook's cavity to achieve a desired distance between the V-shaped ends 29A and 29B. The clamp diameter between the V-shaped ends 29A and 29B is adjusted by turning the knurled knob 22 on the end of the threaded screw 20, thus allowing the coupler to couple varying size equipment. The screw 20 extends through holes formed in the jaws 21 and 23 and in the spring insert 24, and it is threaded into a hole formed adjacent the end of an arm 12 or 13.

The coupler provides easy mobility of the equipment coupled as the clamps and the arms are both able to rotate around the threaded screws 20 and the clamps 14 and 15 are also able to respectively rotate transversely around the arms 12 and 13. This rotatability allows a wheelchair 18 coupled to an IV pole 16 to make normal movements such as being tilted back on its rear wheels without tilting the IV pole 16. Tilting of the IV pole is prevented because the clamp 14 attached to the wheelchair 18 transversely rotates around arm 12 with the movement of the chair. This ability to rotate also allows equipment that is coupled together to be at two different heights, thus allowing this equipment to be more easily transported over a step or curb.

The arms 12 and 13 which are connected respectively to the clamps 14 and 15 that are coupled to the equipment are interconnected by an adjustable arm rotation locking device 26 best shown in FIG. 3. This device allows the arms 12 and 13 to rotate around the center of the device. The adjustable arm rotation locking device includes a bottom cylindrical piece 28A connected or welded to one arm 12 and a top cylindrical piece 28B similarly connected to another arm 13. Each piece has at least one rigid or grooved surface 30A and 30B consisting of teeth 34 and cavities (or grooves) 36 between the teeth. The grooved surface of each piece faces and meshes to intimately contact each other to couple and help lock the pieces 28A and 28B together. The teeth of grooved surface 30A fit into the cavities between the teeth of grooved surface 30B and the teeth of grooved surface 30B fit into the cavities between the teeth of grooved surface 30A to prevent rotational movement of one cylindrical piece relative to the other. A threaded stud 32 runs through the center of both pieces 28A and 28B and extends above one of the pieces 28A. A screw knob 38 screws onto this stud to tighten and lock the adjustable arm rotation locking device in place. This locking creates a fixed angle of the attached arms with respect to one another. To create a different arm angle, one would loosen the screw knob 38 in order to remove the teeth from the grooves, pick the top piece 28B up and rotate that piece to the desired angle. The number of different arm angles able to be formed is based on the number of grooves or teeth in the grooved surfaces 30A and 30B. Once the arm rotation locking device is locked, the angle is fixed and remains fixed in use. The different angles formed by the adjustable arm rotation device allows coupled pieces of equipment to be transported at different angles with respect to one another. This, for instance, would allow an IV pole to be both coupled to a wheelchair and be positioned to the back and side of that wheelchair. This arrangement, as seen in FIG. 1, would allow a nurse or person to be directly behind a wheelchair and push that wheelchair without tripping over the trailing IV pole.

Not only can the coupler be used with wheelchair transportation, but it can also be used in other modes of patient transportation. For example, it can couple an IV pole to a bed, gurnee, or stretcher. The coupler can also be used to couple two IV poles together. This is important as the IV pumps must be cleaned for each new patient and, therefore, cannot immediately be used from one patient to another. Thus a person, such as a central supply attendant, could more efficiently and safely carry more than the normal two IV poles per trip.

The coupler can also be used to stabilize equipment that does not need to be transported. For example, by coupling a top heavy IV pole to a stationary bed, the coupler would provide stability to the pole and prevent toppling.

The coupler as shown in the drawings is also easily and safely storable when not in use. Since both clamps 14 and 15 can swivel or transversely rotate relative to the arms 12 and 13, both clamps can simultaneously be attached to a single IV pole (when the arms are locked in a straight line). Both clamps being attached to the IV pole prevents the coupler from swinging on the pole and from being misplaced.

All the coupler components except the spring insert and the threaded stud for the arm rotation locking device and the threaded screws for the clamp connections are preferably composed of aluminum to make it lightweight and resistant to wear. The threaded stud, threaded screws and the spring insert are preferably composed of metal. The clamps may have rubber inserts or be coated with a rubber or plastic material for a nonslip fit. There are of course other materials which could be utilized for the coupler parts.

While the above described embodiments are within the scope of the present invention, it will be understood that it is not limited thereto, but is susceptible of modification and therefore this invention is not limited to the embodiment shown and described herein, but includes all structure falling within the scope of the claims.

What is claimed is:

1. A coupler for interconnecting a plurality of pieces of equipment comprising:
   a plurality of attachment means each being adapted to be coupled to one of said pieces of equipment,
   a plurality of arms each having a first end and a second end, pivot means between each of said first ends and one of said attachment means for pivotably connecting said attachment means to said arms; and
   an adjustable arm rotation locking means connected to each of said second ends of said arms and locking said arms together at a desired orientation angle.

2. The coupler of claim 1, wherein said adjustable arm rotation locking means connects said arms for relative rotation on a first axis, and said pivot means is such that said attachment means are transversely rotatable relative to said first axis.

3. A coupler for interconnecting a plurality of pieces of medical equipment comprising:
   a plurality of attachment means each being adapted to be coupled to one said piece of medical equipment,
   a plurality of arms each having a first end and a second end, pivot means between said first end of each arm and one of said attachment means for pivotably connecting said attachment means to said arms; and
   an adjustable arm rotation locking means connected to each of said second ends of said arms for relative rotation of said arms on an axis and for locking said arms at a desired orientation angle.

4. The coupler of claim 3, wherein said pivot means is such that said attachment means are transversely rotatable relative to said axis.

5. The coupler of claim 3, wherein said adjustable arm rotation locking means comprises a cylindrical piece attached to said second end of each arm, each cylindrical piece having a grooved surface which is engaged with a grooved surface of another cylindrical piece to lock said arms.

6. The coupler of claim 3, wherein said attachment means comprises a clamp.

7. A coupler for interconnecting a plurality of pieces of medical equipment comprising:
   a plurality of attachment means each being adapted to be coupled to one said piece of medical equipment,
   a plurality of arms each having a first end and a second end, said first end of each arm being connected to one of said attachment means; and
   an adjustable arm rotation locking means connected to each of said second ends of said arms and locking said arms at a desired orientation angle, said attachment means comprising a clamp, and:
   a first jaw having a hooked end and a V-shaped end;
   a second jaw having a straight end and V-shaped end, said straight end being retained within said hooked end of said first jaw whereby said second jaw is adapted to be pivoted within said hooked end of said first jaw, said V-shaped ends forming a clamp opening therebetween; and
   a spring insert located between said first and second jaws.

8. A coupler for connecting an intravenous pole with a piece of medical equipment comprising:
   a first attachment means adapted to be connected to said intravenous pole;
   a second attachment means adapted to be connected to said piece of medical equipment;
   a first arm having first and second ends, first pivot means for pivotably connecting said first end to said first attachment means;
   a second arm having first and second ends, second pivot means for pivotably connecting said first end to said second attachment means; and
   an adjustable arm rotation locking means connected to said second ends of said arms for pivotably connecting said arms for relative movement on an axis and for locking said arms at a desired orientation angle.

9. The coupler of claim 8, wherein said first and second pivot means are such that said first and second attachment means are transversely rotatable relative to said axis respectively around said first and said second arms.

10. The coupler of claim 9, wherein said first and second attachment means comprise clamps.

11. The coupler of claim 8, wherein said adjustable arm rotation locking means comprises a top cylindrical piece and a bottom cylindrical piece each having a grooved surface wherein said grooved surface of said top cylindrical piece intimately contacts said grooved surface of said bottom cylindrical piece to lock in place said first arm with respect to said second arm.

12. A coupler for connecting an intravenous pole with a piece of medical equipment comprising:
- a first attachment means adapted to be connected to said intravenous pole;
- a second attachment means adapted to be connected to said piece of medical equipment;
- a first arm having first and second ends wherein said first end is connected to said first attachment means;
- a second arm having first and second ends wherein said first end is connected to said second attachment means; and
- an adjustable arm rotation locking means connected to said second ends of said arms and locking said arms at a desired orientation angle, said first and second attachment means being transversely rotatable respectively around said first and said second arms, said first and second attachment means comprising clamps, and each of said clamps comprising:
- a first jaw having a hooked end and a V-shaped end;
- a second jaw having a straight end and V-shaped end, said straight end being retained within said hooked end of said first jaw wherein said second jaw's V-shaped end faces said first jaw's V-shaped end creating a space between said V-shaped ends and wherein said second jaw is adapted to be pivoted within said hooked end of said first jaw thereby changing said space between said V-shaped ends of said first and second jaws; and
- a spring insert located between said first and second jaws.

* * * * *